(12) United States Patent
Hiller (10) Patent No.: US 8,594,640 B2
(45) Date of Patent: Nov. 26, 2013

(54) METHOD AND SYSTEM OF PROVIDING AN AUDIO PHONE CARD

(75) Inventor: Scott L. Hiller, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1391 days.

(21) Appl. No.: 11/959,836

(22) Filed: Dec. 19, 2007

(65) Prior Publication Data

US 2009/0163188 A1 Jun. 25, 2009

(51) Int. Cl.
*H04M 3/42* (2006.01)
(52) U.S. Cl.
USPC ............ 455/414.3; 455/414.1; 455/3.06; 455/403; 379/201.01; 379/67.1; 379/88.17; 379/101.01; 705/400; 705/901

(58) Field of Classification Search
USPC ......... 455/412.1, 412.2, 414.2, 414.3, 414.4, 455/415, 418–420, 456.3, 466, 550.1, 455/556.1, 556.2, 558, 563, 566, 567, 455/405–409; 705/14.4, 14.41, 14.49, 705/14.64, 14.67, 14.69; 379/88.01, 88.02; 704/235, 251, 257

See application file for complete search history.

(56) References Cited

U.S. PATENT DOCUMENTS

| | | | |
|---|---|---|---|
| 7,058,689 B2 * | 6/2006 | Parker et al. ............... | 709/206 |
| 2002/0112243 A1 * | 8/2002 | Hunter et al. .............. | 725/92 |
| 2003/0033198 A1 * | 2/2003 | Flannery et al. ............ | 705/14 |
| 2005/0060745 A1 * | 3/2005 | Riedl et al. ................ | 725/42 |
| 2006/0085521 A1 * | 4/2006 | Sztybel ..................... | 709/219 |
| 2007/0038931 A1 * | 2/2007 | Allaire et al. .............. | 715/526 |

* cited by examiner

*Primary Examiner* — Mahendra Patel (57) ABSTRACT

An approach is disclosed for providing an audio phone card. A telephone call is received for an audio service from a voice station by user. Audio content is transmitted to the user over the telephone call, wherein playback of the audio content is controlled by the user via the telephone call.

18 Claims, 8 Drawing Sheets

METHOD AND SYSTEM OF PROVIDING AN AUDIO PHONE CARD

BACKGROUND INFORMATION

The telecommunications industry offers a wide variety of telephony services to customers via wired and wireless networks. However, with the advent of the Internet, an increasing number of individuals have been migrating from the use of traditional communications based technologies to synergistic multimedia platforms. As such traditional telecommunications service providers are being challenged to develop new services and features in order to remain competitive, as well as develop new sources of revenue. Although the telecommunications industry has embraced the convergence of voice and data services, the development of new products and services, e.g., on-demand delivery of audio content, has been skewed towards the data networking infrastructure, despite the large installed base of plain of telephone service (POTS) customers and rapidly evolving wireless telephony systems.

Therefore, there is a need for an approach that provides efficient and convenient audio content services that leverage telephony systems and services.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing audio services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
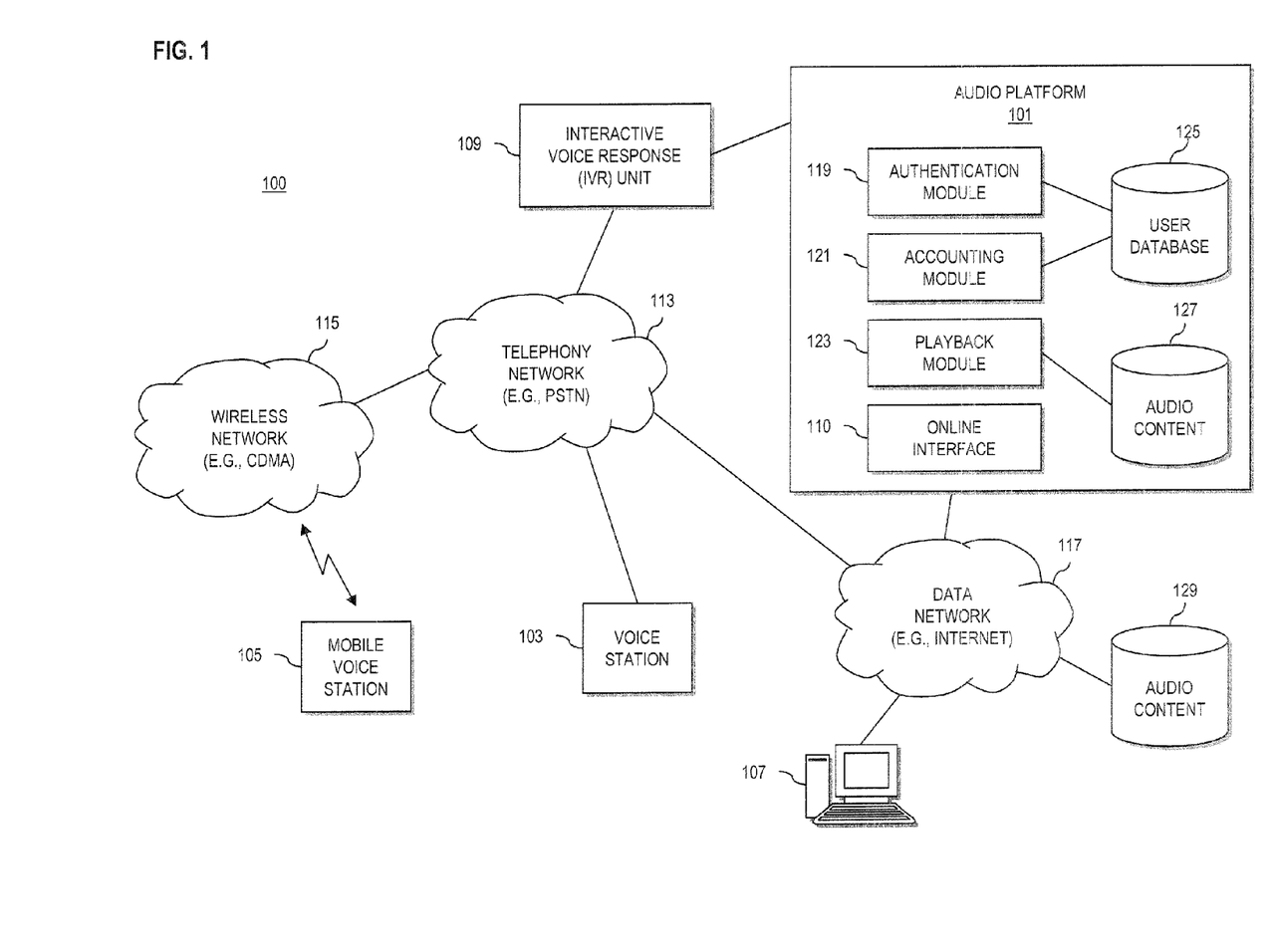
FIG. 1 is a diagram of a system capable of providing audio services, according to an exemplary embodiment.

FIG. 1 is a diagram of a system capable of providing audio services, according to an exemplary embodiment. For the purposes of illustration, a system 100 is described with respect to an audio platform 101 configured to provide audio content to one or more voice enabled devices as part of an audio service, such as a prepaid audio service. While specific reference will be made thereto, it is contemplated that any multimedia platform may be utilized to deploy any multimedia service, such as an animation, image, gaming, or video service, as well as any other suitable form of multimedia. Accordingly, system 100 may embody many forms and include multiple and/or alternative components and facilities.

Traditionally, audio content (such as audio books) have been provided to consumers in multiple compact disc (CD), digital versatile disc (DVD), or cassette tape formats. Such mediums can be cumbersome to transport, as well as switch between during playback, especially when consumers are performing other tasks, such as operating a motor vehicle. Multiple disc changers and digital music players have served to make audio content more portable, however, require users to carry around additional equipment, which can be inconvenient, and thus discourage the users from listening to the audio content altogether.

Modern consumers, however, are almost always near, or carry with them, a telephony device, such as a cellular telephone. Furthermore, automobiles are being increasingly equipped with "hands free" telephony interfaces. Therefore, the approach according to certain embodiments stems from the recognition that deploying audio content through a telephony interface, provides an efficient and convenient technique to enable consumers the convenience of ubiquitous access to audio entertainment without having to carry around additional playback equipment or audio content mediums.

It is further noted that, despite the success of prepaid communication services, telecommunication service providers have paid little attention to extending and enhancing the scope of these prepaid services, especially within the realm of prepaid multimedia services. As such, the approach according to other embodiments steins the recognition that deploying audio content through prepaid audio content phone cards, provides telecommunications service providers a synergistic approach to leverage upon their existing prepaid communications business models and infrastructures to generate new sources of revenue.

Accordingly, system 100 introduces a prepaid audio service whereby users establish a communication session from a voice enabled device (e.g., voice station 103, mobile voice station 105, and/or computing device 107) to receive audio content over the communication session, wherein playback of the audio content can be controlled by the user via the communication session. In particular implementations, the communication session may be established by placing a telephone call to an interactive voice response (IVR) unit 109, wherein users input an authentication code (e.g., a personal identification number (PIN), voice print, etc.) associated with a calling card via the telephone call. In this manner, users may access the prepaid audio service of platform 101 by placing a telephone call to a designated telephone number, such as a toll-free access number (e.g., 1-800, 1-888, etc.). According to other embodiments, users may register, record demographic information, and receive a PIN through an online interface 110, e.g., web interface, maintained by platform 101. As such, consumers may access various forms of audio content, e.g., audio books, musical compilations, pod casts, etc., from any voice-enabled terminal having connectively to system 100.

In an exemplary embodiment, a user utilizes a voice enabled device (e.g., voice station 103, which may be a plain old telephone service (POTS) device) to establish a communication session with IVR unit 109 over telephony network 113. The telephony network 113 can be any circuit-switched network, such as the public switched telephone network (PSTN), an integrated services digital network (ISDN), etc. Additionally, users may access IVR unit 109 via wireless network 115 utilizing a mobile voice station 105, e.g., a cellular telephone, a satellite telephone, a smart telephone, a wireless telephone, or any other suitable mobile voice-enabled device, such as a personal digital assistant (PDA), a pocket personal computer, a tablet, customized hardware, etc. Accordingly, wireless network 115 may employ various technologies, including code division multiple access (CDMA), enhanced data rates for global evolution (EDGE), general packet radio service (GPRS), global system for mobile communications (GSM), etc., as well as any other suitable wireless medium, e.g., microwave access (WiMAX), wireless fidelity (WiFi), satellite, and the like. Still farther, IVR unit 109, as well as audio platform 101, may be accessible to voice-enabled computing devices 107 via data network 117, such as a local area network (LAN), a metropolitan area network (MAN), a wide area network (WAN), the Internet, or any other suitable packet-switched network. In this manner, voice-enabled computing devices 107 may be any computing device capable of packetized voice communications, such as a voice over internet protocol (VoIP) telephone, personal computer with microphone and speaker capabilities, etc.

Although depicted as separate entities, networks 113, 115, and 117 may be completely or partially contained within one another, or may embody one or more of the aforementioned networks. For example, telephony network 113 may comprise any circuit switched and/or packet-switched telephony network that includes facilities to provide for transport of circuit switched and/or packet-based telephony communications.

IVR unit 109, among other functions, collects and provides information to users from platform 101, as well as provides users navigation (i.e., playback control) abilities. While shown as a block entity, IVR unit 109 may include a communication interface (e.g., telephony interface), a resource manager, and a voice browser. The IVR system 109 utilizes the communication interface for communicating with one or more users over the telephony network 113, and in certain other embodiments, wireless network 115 and/or data network 117, as well. In alternative embodiments, other interfaces are utilized depending on the access method of the user. Moreover, although IVR unit 109 is shown as a standalone system, such functionality may be assumed by platform 101 and/or provided in distributed fashion.

A resource manager of IVR unit 109 provides various speech resources, such as an automatic speech recognizer (ASR) and a text-to-speech (TTS) engine. The TTS engine converts textual information (digital signal) from platform 101 to speech (analog signal) for playback to a user. As such, audio content may be stored as delimited text files, as apposed to one or more multimedia files. The TTS engine accomplishes this transition between text and speech through a front-end input and a back-end output. The input converts raw text into its written-out word equivalent through text normalization, pre-processing, and/or tokenization. Words are then assigned phonetic transcriptions and divided into prosodic units, e.g., phrases, clauses, and/or sentences. Using this combination of phonetic transcriptions and prosody arrangements, the front-end input communicates a symbolic linguistic representation to the back-end output for synthesizing. Based on the desired level of naturalness or intelligibility, the back-end output is capable generating speech waveforms representing the actual audible output transmitted to user, i.e., audio content provided by platform 101.

The ASR can effectively function as a speech recognition system. As such, the ASR effectively converts a spoken language (represented by analog signals) into textual or an equivalent symbolic form (digital signal) for processing by, for example, the voice browser that may interface with audio platform 101. The voice browser may play prerecorded audio content to the user in lieu of, or in addition to, use of the TTS engine. As such, the audio content provided via platform 101 may also be stored in corresponding multimedia formats, which may provide for more realistic playback. According to one embodiment, the resource manager of IVR unit 109 may include an analog-to-digital and digital-to-analog converter for signaling between one or more of the voice enabled devices (e.g., voice station 103, mobile voice station 105, and/or computing device 107) and the voice browser, for example. Further, in alternative embodiments, the voice browser may contain speech recognition and synthesis logic that implements the above, thereby extracting meaning from the spoken utterances of a user and producing acoustic renditions of text directly.

In this manner, the voice browser functions as a gateway between a call, for example, and a variety of networked applications, e.g., the audio content applications of platform 101. The voice browser can employ a microphone, keypad, and a speaker instead of a keyboard, mouse, and monitor of a conventional web-based system. The voice browser processes pages of markup language, such as voice extensible markup language (VoiceXML), speech application language tags (SALT), hypertext markup language (HTML), and others such as wireless markup language (WML) for wireless application protocol (WAP) based cell phone applications, and the World Wide Web (W3) platform for handheld devices, residing on platform 101. Since a broad level of markup languages are supported, the voice browser can be configured accordingly, to include a VoiceXML-compliant browser, a SALT-complaint browser, an HTML-compliant browser, a WML-complaint browser or any other markup-language complaint browser, for communicating with users. As with standard web services and applications, the voice browser can utilize a standardized networked infrastructure, i.e., hypertext transport protocol (HTTP), cookies, web caches, uniform resource locators (URLs), secure HTTP, etc., to establish and maintain connections.

Accordingly, IVR unit 109 acts an all-purpose portal to audio platform 101, wherein users can interact with IVR unit 109 (and thereby platform 101) using either spoken utterances or dual-tone multi-frequency (DTMF) signals, or other suitable interfacing signal. This enables IVR unit 109 to establish one or more communication ports for receiving communication sessions (e.g., telephone calls) for the audio service from one or more voice-enabled devices (e.g., voice station 103) by users. IVR unit 109 may also retrieve audio content from platform 101 and transmit the audio content to the user over the communication session. In turn, IVR unit 109 may receive control commands, e.g., spoken utterances or DMTF signals, from a user at a voice-enabled device (e.g., mobile voice station 105) for controlling the playback of the audio content via the communication session.

Thus, according to an exemplary embodiment, audio platform 101 may comprise computing hardware (such as described with respect to FIG. 8), as well as include components configured to execute the processes described herein for providing audio content to users at the voice-enabled devices (e.g., voice station 103, mobile voice station 105, and/or computing device 107).

As shown, platform 101 includes authentication module 119, accounting module 121, playback module 123, and online interface 110, as well as one or more repositories, such as user database 125 and audio content database 127. It is contemplated, however, that platform 101 may embody many forms and include multiple and/or alternative components. For example, it is contemplated that the one or more components of platform 101 may be combined, located in separate structures, and/or separate physical locations. In other words, a specific topology is not critical to embodiments of platform 101 or system 100.

Authentication module 119 can be implemented in concert with IVR unit 109 and/or online interface 110 for authenticating users to the prepaid audio service of system 100. That is, the authentication module 119 may verify user provided credential information against corresponding credential information within user profiles database 125 to provide selective access to the functions of platform 101. By way of example, the credential information may include "log on" information corresponding to a user name, password, code, or other unique identification parameter, such as a PIN. In certain other embodiments, the credential information may include any one or combination of a birth date, an account number (e.g., bank, credit card, billing codes, etc.), a social security number (SSN), an address (e.g., work, home, internet protocol (IP), media access control (MAC), etc.), telephone listing (home, work, cellular, etc.), as well as any other form of uniquely identifiable datum, e.g., biometric code, voice print, etc. Users may provide this information using either spoken utterances transmitted through the ASR of IVR unit 109 or DTMF signals transmitted via the communication interface of IVR unit 109. Unobtrusive security may be provided by positively identifying and screening users based on their voice prints transmitted from IVR unit 109. Such voice prints may be stored after an initial user profile account building session, such as the process described later in accordance with FIG. 6.

Accounting module 121 provides call accounting features and call routing information based upon a remaining amount of a predefined allotment of time for accessing the prepaid audio service of platform 101. This predefined allotment of time is assigned to a user, via a corresponding user profile and/or credential information (e.g., PIN), based on the purchase or recharging of, for example, a prepaid audio content card. As such, users may be assigned individual account profiles associated with, for instance, the credential information provided on a prepaid audio card, as is described later in conjunction with FIG. 5. According to one embodiment, the credential information (e.g., PIN) may also correspond to one or more available audio content files available for playback. Thus, accounting module 119 may track the duration of the playback of audio content to a user and determine whether the tracked duration exceeds a threshold time allotment based on the duration of the audio content and/or one or more communication sessions establish by a user for accessing the audio content. As such, authentication module 121 may terminate playback procedures upon the exhaustion of the threshold amount of playback time. According to various embodiments, however, accounting module 119 may also enable users to recharge or purchase additional playback time.

While not illustrated, platform 101 (namely accounting module 121) may also be in communication with an automated clearing house (ACH), a wire transfer system, a debit card system, a credit card system, or any other suitable electronic funds transfer (EFT) system as is known, for billing and payment purposes. In these embodiments, one or more originating depository financial institutions and one or more receiving depository financial institutions can be included.

Playback module 123 may be configured to transmit audio content to a user via IVR unit 109 and/or online interface 110. This audio content may be retrieved from audio content repository 127 of platform 101, or retrieved from any other suitable audio content source, such as audio content repository 129 accessible over data network 117. Audio content repository 129 may be owned and operated by the service provider of platform 101 or may be associated with a third-party provider. According to certain embodiments, audio content may include live audio feeds. In any instance, however, playback module 123 may retrieve various audio content from repositories 127 and/or 129, as well as any audio content source, based on an audio content selection received from a user at IVR unit 109 and/or based on user credential information (e.g., PIN) provided by a user. Further, playback module 123 may respond to user control commands input to IVR unit 109 for controlling the playback of the audio content via the communication session. These control functions may include: start session (e.g., play), back/forward (e.g., reviewing), rewind, pause audio session, fast-forward, end session (e.g., stop), as well as any other suitable trick mode or control capability, e.g., toggling between audio content sources, mute, scan, etc. According to one embodiment, control commands may include functions for advancing to (e.g., next) or receding from (e.g., previous) audio tracks of a musical compilation or chapters of, for example, an audio book. In this manner, any suitable playback control function may be provided by playback module 123, wherein these control commands may be dynamically tailored to the audio content being experienced. These various control functions may be associated with corresponding spoken utterances of the command, or may be associated with corresponding DTMF signals, or other suitable input parameter, such as any form of control signal (e.g., coded instruction, command line, script, etc.) provided via, for example, mobile voice station 105 and/or computing device 107.

As shown, platform 101 may also behave as a website (or other online interface 110) to permit access to the audio content by voice-enabled computing devices 107 and/or mobile voice station 105 over data network 117 and/or wireless network 115, respectively. According to certain embodiments, the audio content may be experienced via a web browser or other web-based application. Furthermore, online interface 110 may execute a graphical user interface (GUI) application configured to provide users with one or more menus of options relating to the playback of audio content, as well for building user profile accounts and/or recharging (or purchasing additional) playback time for users to engage with the audio content service of system 100. According to particular embodiments, online interface 110 enables users to "download" audio content from platform 101 to a suitable memory, such as a memory of mobile voice station 105, etc. In other embodiments, users may be enabled to "upload" audio content to platform 101, which may be stored to user profiles database 125 and/or audio content repository 127. As such, the GUI(s) of online module 110 may be presented in one or more windows of a conventional browser application. According to certain embodiments, the GUI(s) may be generated and presented in one or more windows controlled by computing device 107 and/or mobile voice station 105. By way of example, mobile voice station 105 may include an audio service interface that provides soft controls for controlling audio content playback and/or manipulating a user account. The interface may include one or more "soft keys" or other graphical user interface (GUI) implementation, e.g., keypad, touch pad, etc., as will be explained in greater detail according to FIG. 7. As such, mobile voice station 105 may include a processor and memory configured to store and execute instructions for supporting the audio service, as well as other communication functions. Accordingly, the GUIs of audio interface 110 (or corresponding devices 105 and/or 107) may comprise pages of both textual and graphical information, as well as various interactive control widgets, through which users may access and interact with platform 101 and/or IVR unit 109. Thus, users at mobile voice station 105 and/or computing device 107 may input commands to online interface 110 to control or otherwise manipulate the audio content service of system 100.

Figure 2:
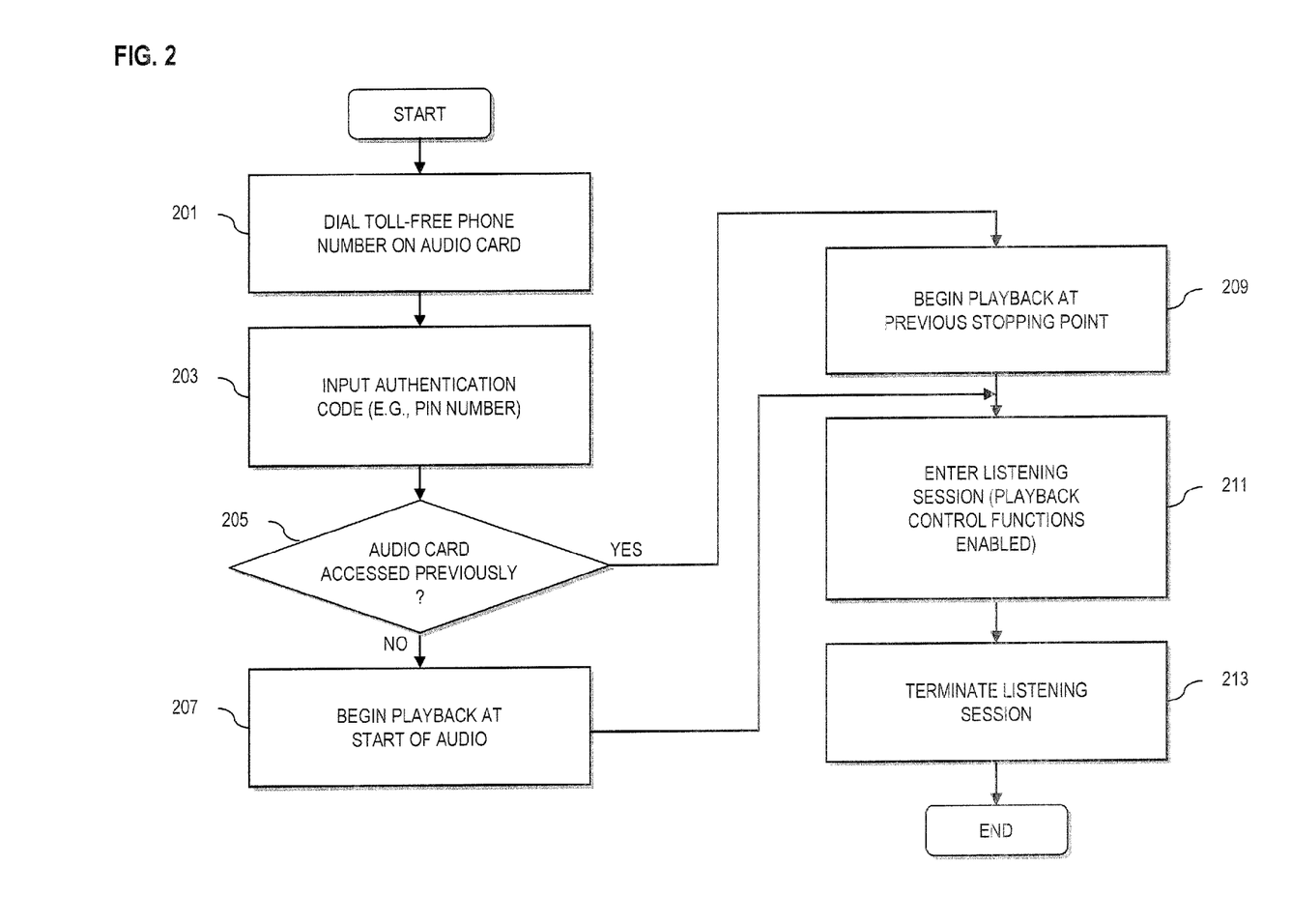
FIG. 2 is a flowchart of a process for delivery of audio content, according to an exemplary embodiment.

FIG. 2 is a flowchart of a process for delivery of audio content associated with the prepaid audio service, according to an exemplary embodiment. At step 201, a user at a voice-enabled device (e.g., voice station 103) establishes a communication session with IVR unit 109 by placing a call to a prepaid service destination address of the audio service of system 100 via, for example, telephony network 113. According to one embodiment, the prepaid service destination address corresponds to a toll-free phone number of the audio service that is illustrated on a face of an audio card previously supplied to the user. A prepaid card number, such as a PIN, or other credential information, may be requested to authenticate the user to the audio service, per step 203.

In step 205, platform 101 determines whether the audio card, associated with a particular audio file, has been previously accessed by the user. Namely, accounting module 121 queries user profiles database 125 for a starting position corresponding to a particular audio file associated with a particular PIN. If the audio file has not been previous accessed, then playback module 123 beings playback at the "beginning" of the audio file associated with the input PIN, per step 207. If the audio tile has been previously utilized, then accounting module 121 provides playback module 123 a corresponding starting point (e.g., time stamp) to being playback at a previous stopping point, per step 209. In step 211, the user enters the listening session at the either the beginning point of the audio or the previous stopping point of the audio. During playback, one or more control functions are made available to the user to control the playback of the audio content via the established communications session. Exemplary control functions are described in more detail with respect to FIGS. 3 and 4. Upon completing playback of the audio content or termination of an allotted period of listening time, the listening session is terminated by playback module 123 and/or accounting module 121, per step 213.

Figure 3:
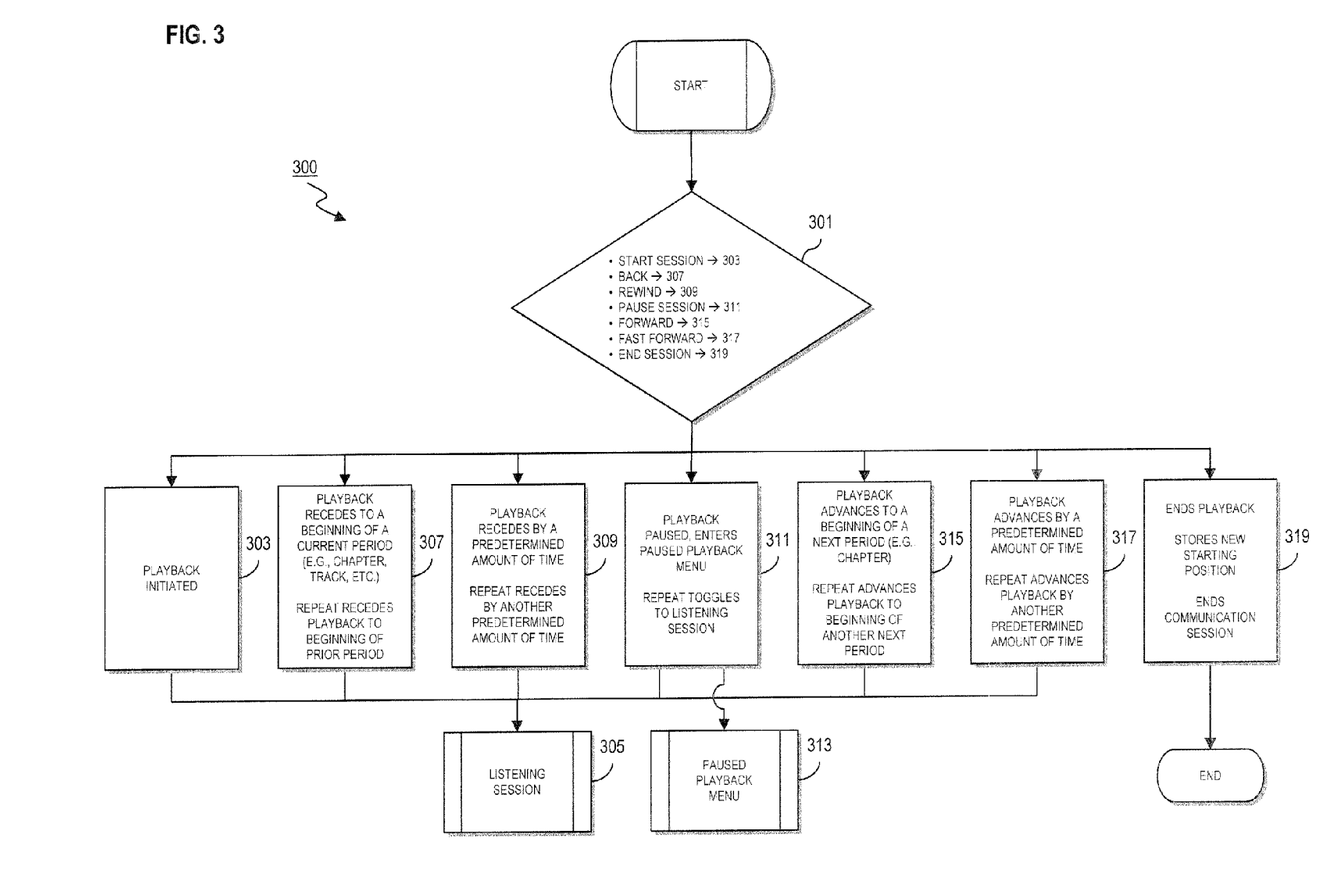
FIG. 3 is a flowchart of a process for controlling the delivery of audio content during a playback state, according to an exemplary embodiment.

FIG. 3 is a flowchart of a process for controlling the delivery of audio content during a playback state, according to an exemplary embodiment. Initially, a user establishes a communication session 300 with, for example, IVR unit 109. This may be achieved by placing a call, via voice-enabled computing device 107, to a prepaid service destination address of the audio service of system 100. In this manner, corresponding communication signals may traverse data network 117 and/or telephony network 113. According to one embodiment, the prepaid service destination address corresponds to a toll-free phone number of the audio service that is illustrated on a face of an audio card (e.g., audio card 500 of FIG. 5) previously supplied to the user. In other implementations, the prepaid service destination address may correspond to a uniform resource locator (URL), or other network address (e.g., internet protocol address), of platform 101. Upon successful authentication (i.e., validation of, for instance, a PIN illustrated on a face of the audio card, such as audio card 500), a user may be presented with a main menu of options, including, in particular implementations, one or more options to select and begin playback of a particular audio file/source. During playback, playback session menu 301 may be made available to the user via voice activation, DTMF input, or other suitable signaling method, to enable the user to control the playback through communication session 300.

Exemplary commands and corresponding descriptions are provided in Table 1, below:

TABLE 1

PLAYBACK SESSION MENU 301

| COMMAND | DESCRIPTION |
| --- | --- |
| Start Session 303 | Playback of a particular audio file is initiated within listening session 305 |
| Back 307 | Playback of listening session 305 is toggled to the beginning of a current period (e.g., chapter of an audio book, track of a musical composition, etc.) Repeated entry toggles playback of listening session 305 to a beginning of correspondingly previous periods |
| Rewind 309 | Playback of listening session 305 is toggled a predetermined amount of time (e.g., five seconds) prior to a current listening state Repeated entry incrementally toggles listening session 305 a predetermined amount of time (e.g., five seconds) prior to a current listening state |
| Pause Playback 311 | Pauses playback of listening session 305 and toggles communication session 300 to paused playback menu 313 Repeated entry returns communication session 300 to listening session 305 |
| Forward 315 | Playback of listening session 305 is toggled to the beginning of the next period, e.g., chapter of an audio book, track of a music composition, etc.) Repeated entry toggles playback of listening session 305 to the beginning of correspondingly next chapters |
| Fast Forward 317 | Playback of listening session 305 is toggled a predetermined amount of time (e.g., five seconds) ahead of a current listening state Repeated entry incrementally toggles listening session 305 a predetermined amount of time (e.g. five seconds) ahead of a current listening state |
| Stop/End Session 319 | Terminates listening session 305, stores a current listening state within user profiles database 1XX for a later session, and terminates communication session 300 |

Figure 4:
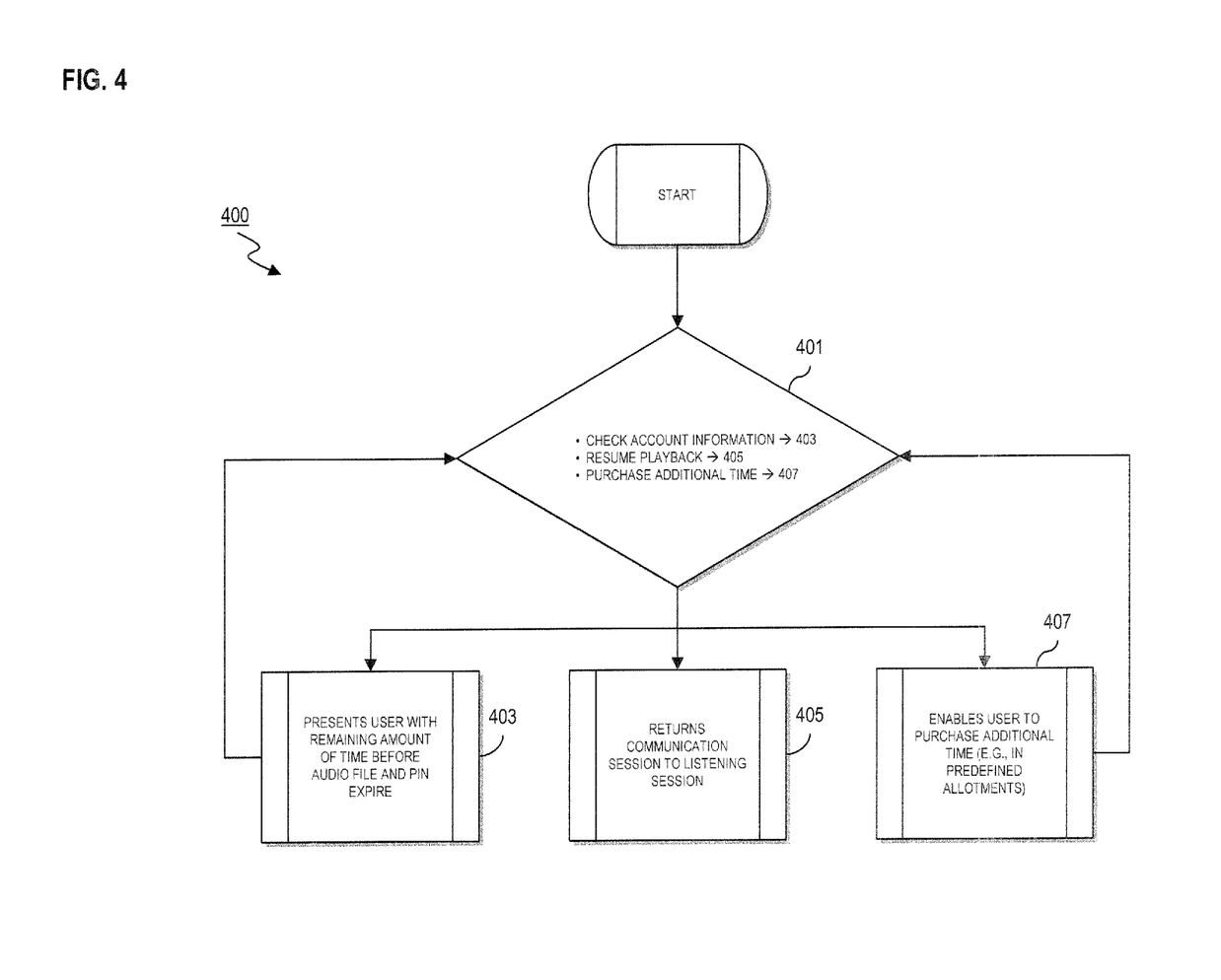
FIG. 4 is a flowchart of a process for controlling the audio service during a paused playback state, according to an exemplary embodiment.

FIG. 4 is a flowchart of a process for controlling the audio service during a paused playback state, according to an exemplary embodiment. Initially, a user pauses playback of a listening session via an input interface of, for example, mobile voice station 105. This input interface may correspond to a voice, key pad, touch screen, etc., interface. By way of example, communication signals corresponding to a user input may traverse wireless network 115 and telephony network 113, on route to IVR unit 109 and/or platform 101. Within this paused playback state, paused playback menu 401 may be made available to users via voice activation, DTMF input, or other suitable signaling method, to enable the user to control the functions provided thereby.

Exemplary commands and corresponding descriptions are provided in Table 2, below:

TABLE 2

PAUSED PLAYBACK MENU 401

| COMMAND | DESCRIPTION |
| --- | --- |
| Check Account Information | Presents user with an amount of time remaining before: the termination of the audio file being experienced; and/or |

TABLE 2-continued

PAUSED PLAYBACK MENU 401

| COMMAND | DESCRIPTION |
|---|---|
| 403 | the termination of the account corresponding to the utilized session PIN |
| Resume Playback 405 | Returns communication session to listening session |
| Purchase Additional Time 407 | Enables users to purchase additional time, such as in predefined allotments |

Figure 5:
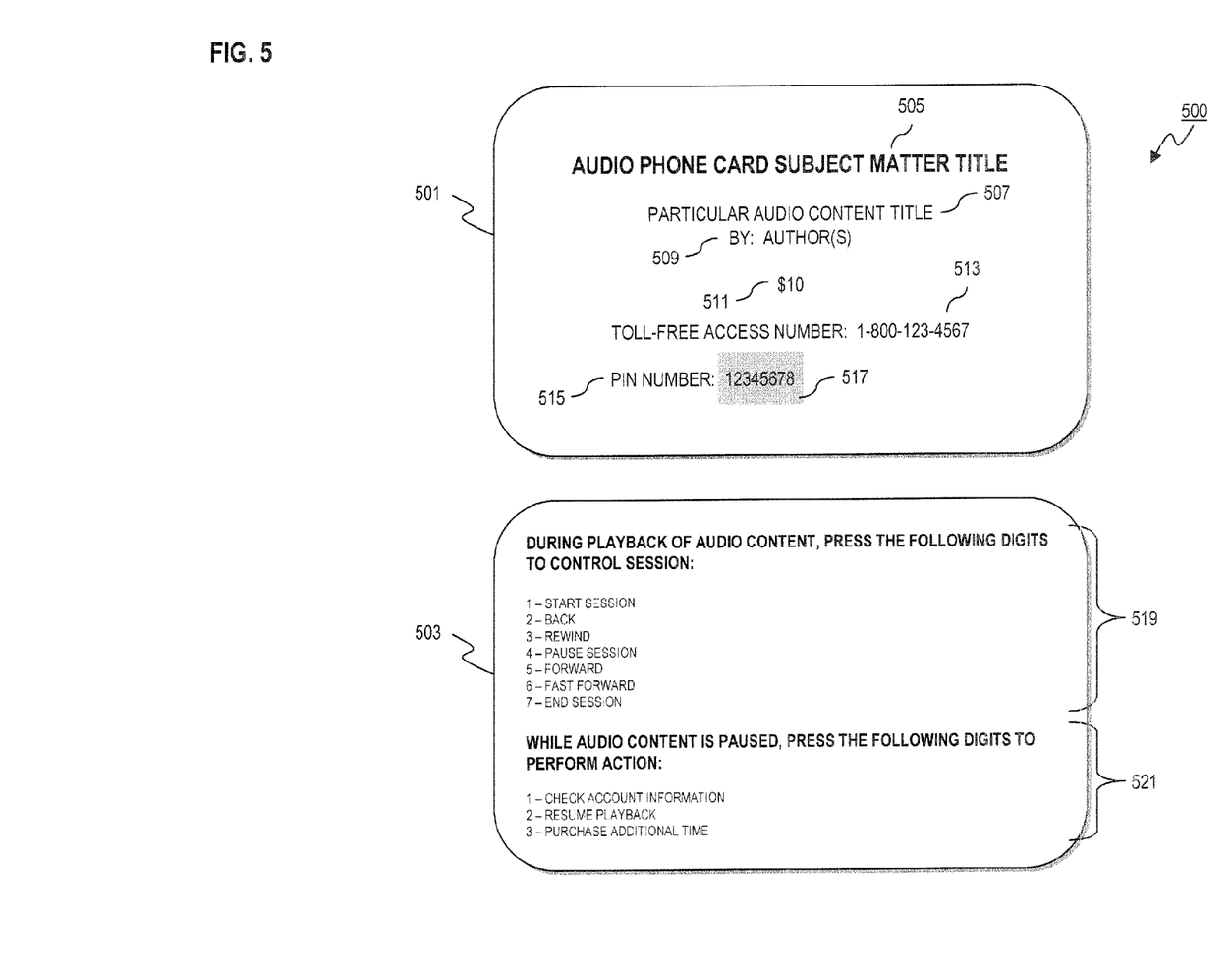
FIG. 5 is a diagram of an audio phone card associated with the prepaid audio service, according to an exemplary embodiment.

FIG. 5 is a diagram of an audio phone card associated with the prepaid audio service, according to an exemplary embodiment. A prepaid audio phone card 500 is illustrated having respective faces 501 and 503. Face 501 may include information such as an audio phone card subject matter title 505, a particular audio content title 507, one or more author(s)/composer(s) 509, and/or a value 511. For example, a prepaid audio phone card 500 corresponding to an audio book may provide title 505 as "AUIDO BOOK PHONE CARD," title 507 as "A TALE OF TWO CITIES," region 509 as "CHARLES DICKENS," and a value of "$5." Face 501 may also include a toll-free access number 513 (e.g., 1-800-123-4567) and a PIN 515 (e.g., 12345678). According to one embodiment PIN 515 may be obscured by a "scratch-off" material (which has been made transparent for illustrative purposes) before purchase for security purposes. Meanwhile, face 503 may include one or more instruction fields, such as fields 519 and 521. As shown, fields 519 and 521 provide control commands for controlling the playback of audio content during a listening state and during paused playback states, respectively. Certain other embodiments, one or more fields may be provided for conveying instructions for activating a prepaid account, for purchasing additional listening time, contacting customer service representatives, etc.

According to one embodiment, the value of the prepaid audio card may be assigned at the time of sale. In certain embodiments, the value may be fixed and printed on card 500, wherein a retailer may stock one or more sets of cards 500 for one or more predetermined number of fixed denominational values. Card 500 may also be generated to correspond to the type of audio content accessible via card 500. For example, card 500 may be a single use card designated for, for example, audio book playback, musical compilation renditions, daily news, etc. Furthermore, cards 500 may be further segregated based on one or more characteristics therein. For example, cards 500 corresponding to audio book playback phone cards may be segregated according to authors, genres, time periods, etc. These characteristics may be included as part of card 500. In other embodiments, card 500 may be a universal audio phone card capable of accessing more than one type to all types of audio content available via platform 101. Card 500 may be a mechanically reproduced object or be "virtualized," i.e., presented in electronic format via, for example, a display interface of computing device 107. In other embodiments, the information of card 500 may be presented to a user in one or more conventional formats, such as electronic mail, facsimile, instant message, postal mail, short message, etc.

Figure 6:
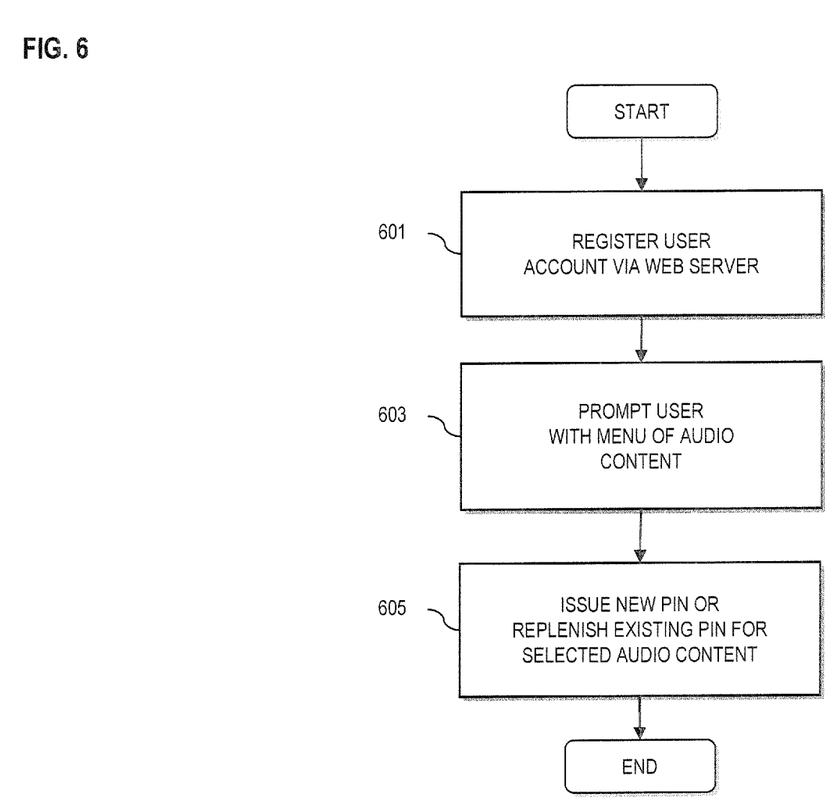
FIG. 6 is a flowchart of a process for manipulating an audio service user account, according to an exemplary embodiment.

FIG. 6 is a flowchart of a process for manipulating a user account associated with the prepaid audio service, according to an exemplary embodiment. Initially, a prepaid audio phone card is issued to a user, such as prepaid audio phone card 500 of FIG. 5. As explained, platform 101 provides a rich set of audio content capabilities through online interface 110. That is, a website can be realized via online interface 110, wherein users are permitted to navigate the online interface for accessing and storing user profile information associated with audio service and/or prepaid audio phone card. According to one embodiment, the user is provided with a personalized space within the website for aggregating this information, searching for available audio content, building play lists, download/uploading audio content, etc. In other embodiments, users may provide additional or alternative credential information (e.g., voice print, etc.) for accessing the services of platform 101. Nevertheless, the personalized space can be accessed through a conventional web browser executing on, for instance, computing device 107. The space may be assigned a uniform resource locator (URL) that indicates, for example, a user identification, signaling address (e.g., voice station 103 phone number), or any other suitable user moniker or distinctive identifier.

Accordingly, users may set-up a user profile via online interface 110 utilizing, for example, computing device 107. At step 601, a user account is registered on the website. Upon successful registration, the online interface 110 may provide a confirmation message/signal to an end terminal associated with the user, e.g., voice station 103, mobile voice 105, and/or voice-enabled computing device 107. Further, platform 101 may transmit a message providing a confirmation code to one or more of the aforementioned end terminals, wherein the user can, in turn, obtain confirmation by replying to the message. It is contemplated, however, that a user may optionally complete the registration process via voice station 103, mobile voice station 105, wherein user profile information corresponding to the contacting device may be ported into user profiles repository 125. In step 603, the user may be prompted within a menu of audio content choices and/or navigational options for obtaining one or more corresponding PINs (or purchasing additional time for an existing PIN) for particular available audio content choices. Per step 605, the online interface 110 may issue corresponding PINs (or replenish a existing PIN) for one or more options selected within the menu of options.

Figure 7:
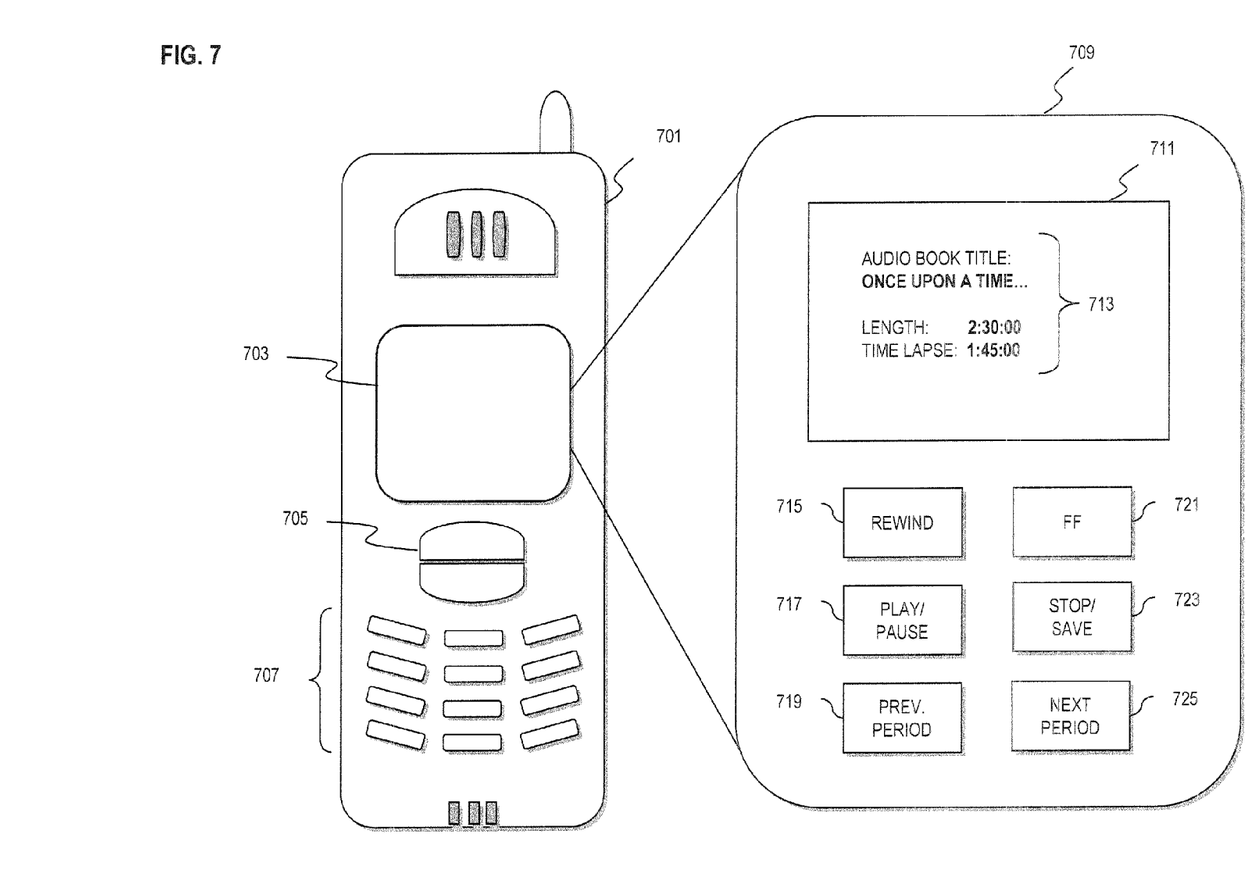
FIG. 7 is a diagram of a mobile voice station capable of receiving audio content, according to an exemplary embodiment.

FIG. 7 is a diagram of a mobile voice station capable of receiving audio content associated with the prepaid audio service, according to an exemplary embodiment. By way of example, the mobile voice station 105 of FIG. 1 can be implemented as a mobile phone 701, which includes a display 703 that is configured to present one or more control options 715-725 (in the form of "soft keys") for experiencing the audio content, such as the audio content available via platform 101. In one embodiment, the user of mobile phone 701 can input control commands corresponding to "soft keys" via a touch interface of display 703, via cursor buttons 705 or key pad 707. Window 711 of display 703 may additionally provide playback information 713, such as an audio book title, total playback length, and a current time lapse (session) amount, as well as any other suitable playback parameter, such as a state of playback (play, pause, fast-forward, rewind, etc.), audio book author, audio book "read by," etc. Further, playback information 713 may dynamically correspond to the type of audio content being listened to. For example, the content may correspond to daily news. In this case, the playback information may relate to a news service provider, anchor person, etc.

The processes described herein for providing audio services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
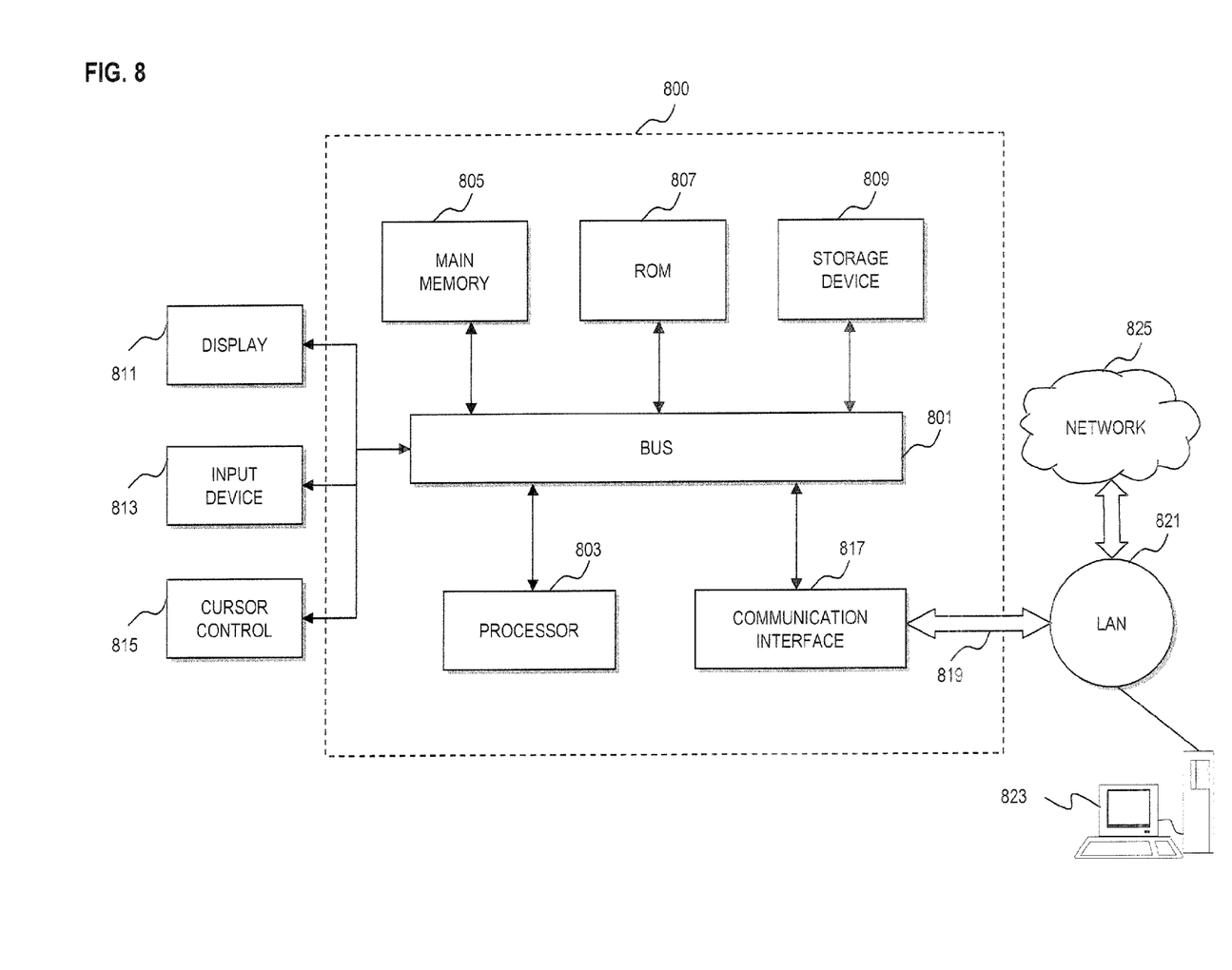
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
receiving a telephone call for an audio service from a voice station by a user;
receiving an authentication code input by the user via the telephone call;
determining, without user interaction, whether the authentication code at a time when a prepaid card is issued or sold is associated with a credit and audio content offered by the audio service via the card;
transmitting the audio content to the user over the telephone call based upon the determination, wherein playback of the audio content is controlled by the user via the telephone call;
tracking duration of the playback of the audio content; and
determining whether the tracked duration exceeds a threshold, wherein the playback is terminated upon exceeding the threshold, and the playback is tracked to decrease the credit stored in the prepaid card.

2. A method according to claim 1, further comprising:
receiving, from the voice station, another audio content uploaded by the user via the telephone call, wherein the another audio content includes content other than voice data of the user.

3. A method according to claim 1, wherein the playback of the audio content is limited to playback during the telephone call, and the prepaid card is a calling card that has a single use.

4. A method according to claim 1, wherein control functions for the playback include pausing, reviewing, and fast-forwarding.

5. A method according to claim 4, wherein the audio content includes an audio book, and the control functions further include a next chapter function, and a previous chapter function.

6. A method according to claim 1, wherein the telephone call is placed to a telephone number designated for the audio service, and the voice station includes a cellular phone.

7. An apparatus comprising:
a port configured to receive a telephone call for an audio service from a voice station by user; and
a processor configured to:
receive an authentication code input by the user via and during the telephone call,
determine, without user interaction, whether the authentication code at a time when a prepaid card is issued or sold is associated with a credit and audio content offered by the audio service via the card,
transmit the audio content to the user over the telephone call based upon the determination, wherein playback of the audio content is controlled by the user via the telephone call;
track duration of the playback of the audio content; and
determine whether the tracked duration exceeds a threshold, wherein the playback is terminated upon exceeding the threshold, and the playback is tracked to decrease the credit stored in the prepaid card.

8. An apparatus according to claim 7, wherein the processor is further configured to receive, from the voice station, another audio content uploaded by the user via the telephone call, wherein the another audio content includes content other than voice data of the user.

9. An apparatus according to claim 7, wherein the playback of the audio content is limited to playback during the telephone call, and the prepaid card is a calling card that has a single use.

10. An apparatus according to claim 7, wherein control functions for the playback include pausing, reviewing, and fast-forwarding.

11. An apparatus according to claim 10, wherein the audio content includes an audio book, and the control functions further include a next chapter function, and a previous chapter function.

12. An apparatus according to claim 7, wherein the telephone call is placed to a telephone number designated for the audio service, and the voice station includes a cellular phone.

13. A system comprising:
an interactive voice response unit configured to receive a telephone call for an audio service from a voice station by a user, to receive an authentication code input by the user via the telephone call, and to determine, without user interaction, whether the authentication code at a time when a prepaid card is issued or sold is associated with a credit and audio content offered by the audio service via the card;
a database configured to store the audio content, wherein the audio content is retrieved by the interactive voice response unit for transmission to the user via the telephone call based upon the determination, wherein playback of the audio content is controlled by the user via the telephone call; and
an application module configured to track duration of the playback of the audio content and to determine whether the tracked duration exceeds a threshold, wherein the playback is terminated upon exceeding the threshold, and the playback is tracked to decrease the credit stored in the prepaid card.

14. A system according to claim 13, wherein the interactive voice response unit is further configured to receive another audio content from the voice station uploaded by the user via the telephone call, wherein the another audio content contains content other than voice data of the user.

15. A system according to claim 13, wherein control functions for the playback include pausing, reviewing, and fast-forwarding.

16. A system according to claim 15, wherein the audio content includes an audio book, and the control functions further include a next chapter function, and a previous chapter function.

17. A system according to claim 13, wherein the telephone call is placed to a telephone number designated for the audio service, and the voice station includes a cellular phone.

18. A method according to claim 1, wherein the telephone call excludes voice call data.

* * * * *